United States Patent
Li et al.

(10) Patent No.: US 10,364,998 B2
(45) Date of Patent: Jul. 30, 2019

(54) THERMOSTAT HAVING OVER CURRENT MANAGEMENT

(71) Applicant: Siemens Schweiz AG, Zürich (CH)

(72) Inventors: Pei Jin Li, Dongguan (CN); Zhan Jun Ding, Shenzhen (CN); William J. Fenske, Arlington Heights, IL (US); Michael S. Schuler, Lockport, IL (US)

(73) Assignee: Siemens Schweiz AG, Zurich (CH)

( * ) Notice: Subject to any disclaimer, the term of this patent is extended or adjusted under 35 U.S.C. 154(b) by 183 days.

(21) Appl. No.: 15/507,497

(22) PCT Filed: Sep. 30, 2014

(86) PCT No.: PCT/CN2014/087892
§ 371 (c)(1),
(2) Date: Feb. 28, 2017

(87) PCT Pub. No.: WO2016/049841
PCT Pub. Date: Apr. 7, 2016

(65) Prior Publication Data
US 2017/0299215 A1    Oct. 19, 2017

(51) Int. Cl.
| | |
|---|---|
| F24F 11/30 | (2018.01) |
| F24F 11/58 | (2018.01) |
| F24F 11/61 | (2018.01) |
| F24F 11/89 | (2018.01) |
| G05D 23/19 | (2006.01) |
| H01H 85/02 | (2006.01) |
| F24F 140/50 | (2018.01) |

(52) U.S. Cl.
CPC .............. *F24F 11/30* (2018.01); *F24F 11/89* (2018.01); *G05D 23/1902* (2013.01); *H01H 85/0241* (2013.01); *F24F 11/58* (2018.01); *F24F 11/61* (2018.01); *F24F 2140/50* (2018.01)

(58) Field of Classification Search
CPC . G05F 1/66; G05D 23/19; H01H 9/30; H01H 9/541; H02H 1/0015
USPC ............................................... 361/93.1, 93.9
See application file for complete search history.

(56) References Cited

U.S. PATENT DOCUMENTS

| | | | |
|---|---|---|---|
| 5,390,506 A | | 2/1995 | Sogabe et al. |
| 6,625,996 B2 * | | 9/2003 | Nakajima ................ F24F 11/30 |
| | | | 62/175 |
| 7,113,380 B2 | | 9/2006 | Youm |
| 8,411,397 B2 | | 4/2013 | Akama |

(Continued)

FOREIGN PATENT DOCUMENTS

| | | |
|---|---|---|
| CN | 1047001 A | 11/1990 |
| CN | 1517824 A | 8/2004 |

(Continued)

OTHER PUBLICATIONS

EP Search Report dated Apr. 24, 2018, for EP Application No. 14903364.9, 8 pages.

(Continued)

*Primary Examiner* — Dharti H Patel

(57) ABSTRACT

An environmental control device (100, 200), such as a thermostat, is disclosed. The environmental control device (100, 200) has one or more terminals (104, 104a-104i) for connecting to an HVAC system (14) and performs over current management of the terminal (104, 104a-104i) when connected to the HVAC system (14).

17 Claims, 6 Drawing Sheets

(56) References Cited

U.S. PATENT DOCUMENTS

| | | | |
|---|---|---|---|
| 9,923,366 B2 * | 3/2018 | Donadille | ............. H02H 9/025 |
| 2006/0032245 A1 | 2/2006 | Kates | |
| 2006/0168459 A1 | 7/2006 | Dwelley et al. | |
| 2008/0043391 A1 | 2/2008 | Wong et al. | |

FOREIGN PATENT DOCUMENTS

| | | |
|---|---|---|
| CN | 101124773 A | 2/2008 |
| CN | 101127509 A | 2/2008 |
| CN | 101509456 A | 8/2009 |
| CN | 101913314 A | 12/2010 |
| CN | 101964595 A | 2/2011 |
| EP | 0570596 A1 | 11/1993 |
| EP | 1150074 A2 | 10/2001 |
| EP | 2754971 A1 | 7/2014 |
| JP | 2010259153 A | 11/2010 |
| JP | 2012005317 A | 1/2012 |
| WO | 2006081112 A1 | 8/2006 |

OTHER PUBLICATIONS

PCT International Search Report and Written Opinion of International Searching Authority dated Jun. 25, 2015 corresponding to PCT International Application No. PCT/CN2014/087892 filed Sep. 30, 2014.

Canadian Office Action dated Nov. 30, 2018, for CA Application No. 2,962,804, 11 pages.

Chinese Office Action dated Jan. 31, 2019, for CN Application No. 201480082350.5, 8 pages.

* cited by examiner

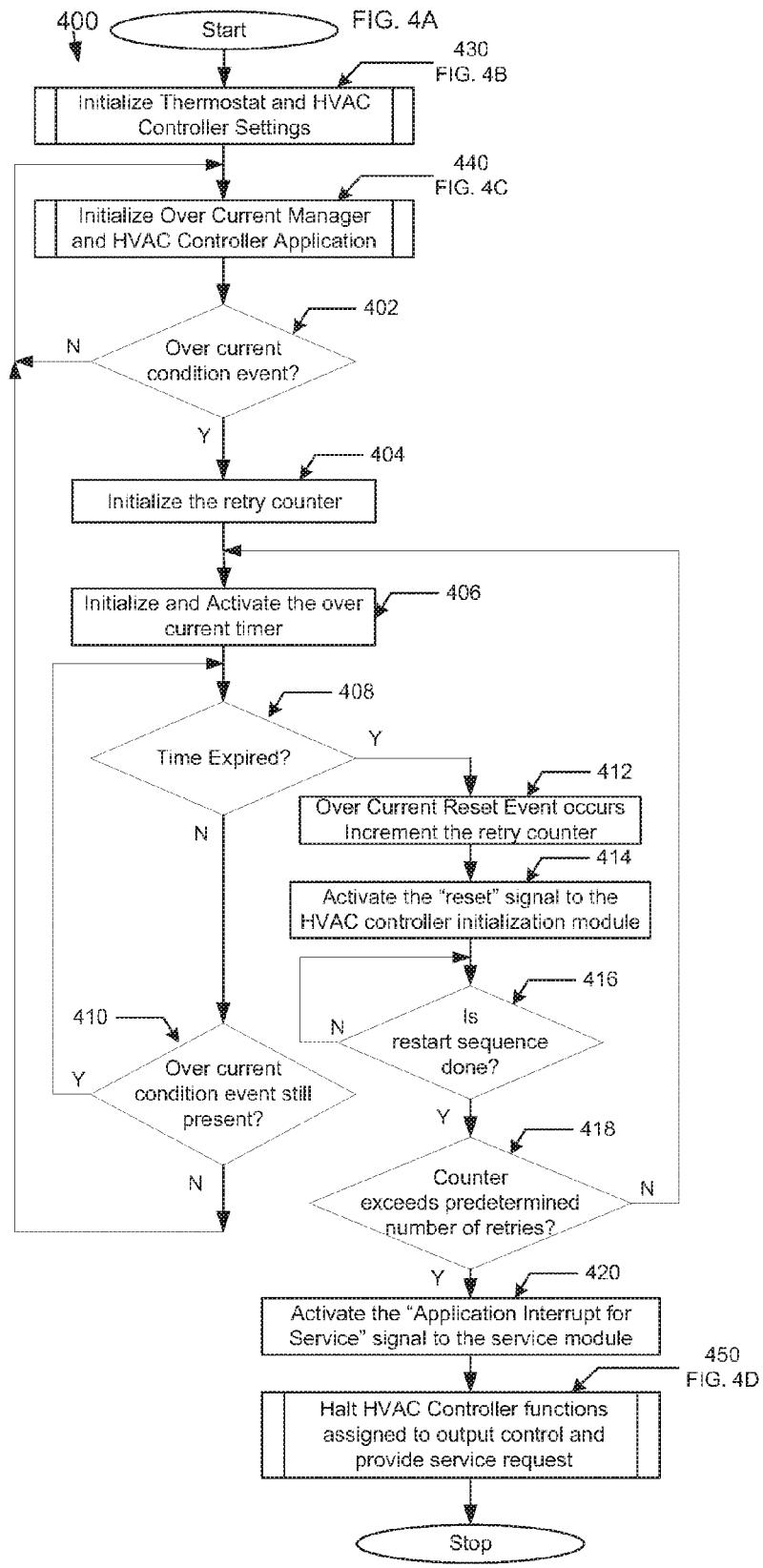

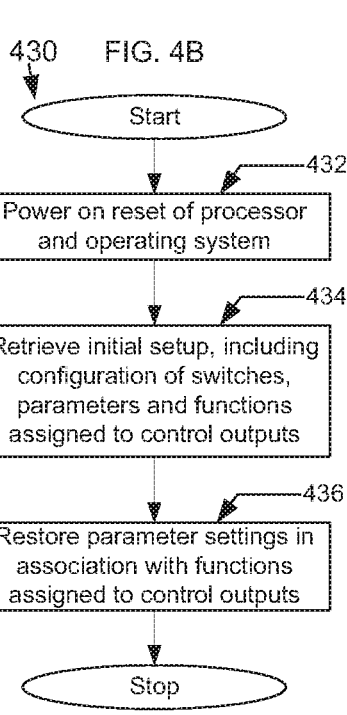
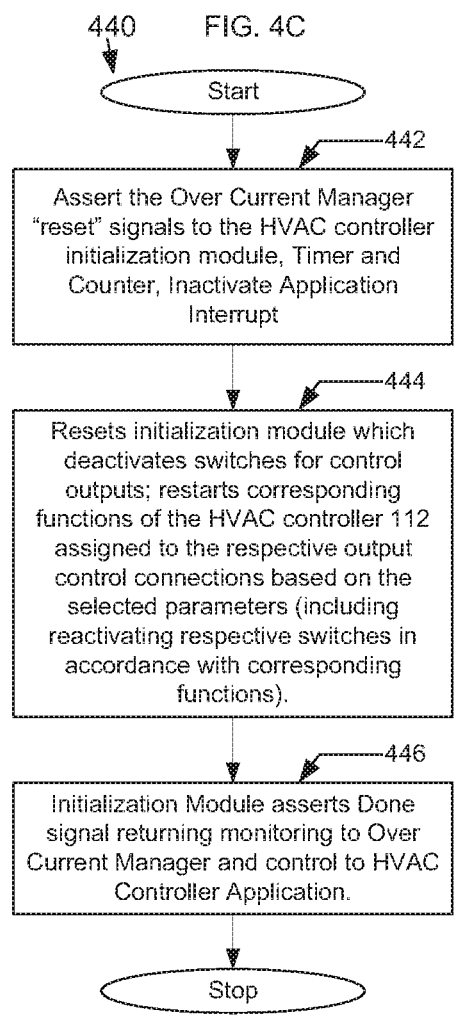

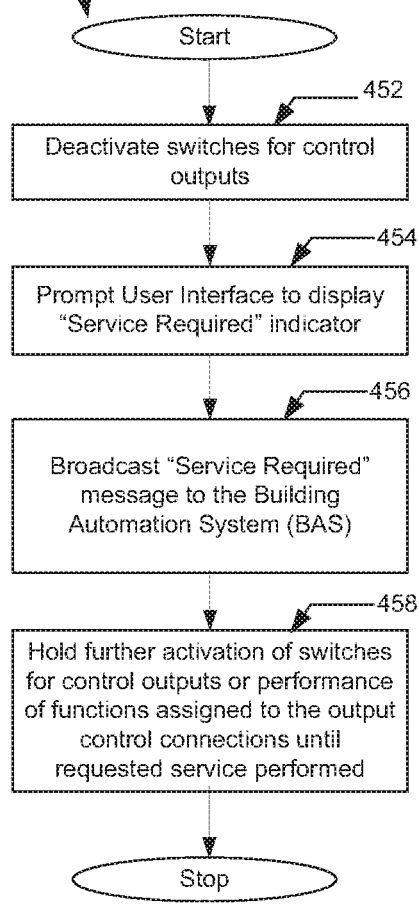

THERMOSTAT HAVING OVER CURRENT MANAGEMENT

TECHNICAL FIELD

The present disclosure is directed, in general, to thermostats and, more particularly, to a thermostat having over current management of control outputs connected to an HVAC system.

BACKGROUND

Thermostats and other temperature control devices are utilized in residential and commercial environments to control and regulate the environmental conditions within a structure. For example, a thermostat control device can regulate the temperature and airflow provided by a residential or commercial heating, ventilation and air-conditioning (HVAC) system. HVAC systems typically have control circuits that are required to be powered by a National Electric Code (NEC) Class 2 power source with a corresponding circuit breaker or current limit protection circuit. In the event that a larger transformer (i.e., not in compliance with a Class 2 power source) or a circuit breaker is not provided in or with the HVAC system, an excessive and potentially dangerous current can be output from the HVAC system and brought into occupied spaces in a building via wiring to the Thermostat control device.

However, conventional thermostats typically do not address the issue of over current protection on control input/output wiring to an HVAC system. Instead, conventional thermostats depend on an external circuit breaker that may or may not be installed at the control transformer for the respective HVAC system to which the thermostat is connected. If present, a conventional external circuit breaker typically trips at twice the rated current and after a long one (1) second time constant, which allows heating of wires, contacts and traces of the thermostat. Conventional thermostats also typically do not address short period over current let through, retries or fault annunciation.

A thermostat sold under the brand name Site Controls by Siemens Industry, Inc., Building Technologies Division, has an over current protection circuit. However, that over current protection circuit breaks connectivity to control outputs based on detection of the over current by hardware components alone without management of the over current issues noted above.

SUMMARY

The disclosed embodiments generally relate to thermostats and more particularly to thermostats configured to provide over current management of one or more control inputs to components of an HVAC system.

In one embodiment, an environmental control device is provided for managing over current of a control input of an HVAC system that includes: a control output terminal, a switch, a power input terminal, an over current detector, a timer and a processor. The switch has an activation input, a signal input and a signal output connected to the control output terminal and coupled to the signal input when the switch is activated via the activation input. The power input terminal is operatively connected to the signal input of the switch such that, when in receipt of a power input signal, the power input signal is presented to the signal input of the switch to drive the control input of the HVAC system when the switch is activated via the activation input. The over current detector has a first input operatively connected to the power input terminal and an associated output. The over current detector compares the power input signal when present on the power input terminal to a pre-determined current level and generates an over-current condition on the over current detector output when a current of the power input signal exceeds the pre-determined current level. The processor is operatively coupled to the activation input of the switch, the over current detector output and the timer. The processor activates the switch via the activation input and determines whether the over current condition is present on the over current detector output. In response to determining the over current condition is present, the processor initializes the timer to a pre-determined time; activates the timer; and determines whether the over current condition is still present on the over current detector output when the timer reflects that the pre-determined time has expired. In response to determining the over current condition is still present when the timer reflects that the pre-determined time has expired, the processor deactivates the switch via the activation input. In one implementation, the timer is set to a predetermined time equal to or greater than a cycle time for the switch to reach a steady state closure when activated.

The environmental control device may also include a counter. In this embodiment, the processor is operably coupled to the counter and further configured to: in response to determining the over-current condition is still present when the timer reflects that the pre-determined time has expired, (a) increment the counter; (b) determine whether the counter exceeds a predetermined number of retries; and (c) in response to determining the counter has not exceeded the predetermined number of retries; reactivate the switch via the activation input.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIGS. 4A-4D illustrates a flow diagram of a process and associated sub-processes for over current management of connections between the environmental control device and an HVAC system.

DETAILED DESCRIPTION

The present disclosure generally relates to environmental monitoring and control systems and more particularly to an environmental control device (such as a "thermostat") configured to detect and control temperature conditions within a structure in association with an HVAC system and to provide the following advantages and technical solutions: over current management of connections (such as Class 2 transformer, switched control signals) to the HVAC system to inhibit damage to the environmental control device, avoid nuisance trips to manually reset a power distribution circuit associated with the HVAC system, and identify corresponding service issues with stuck relays or switches used to control the managed connections to the HVAC system.

Figure 1:
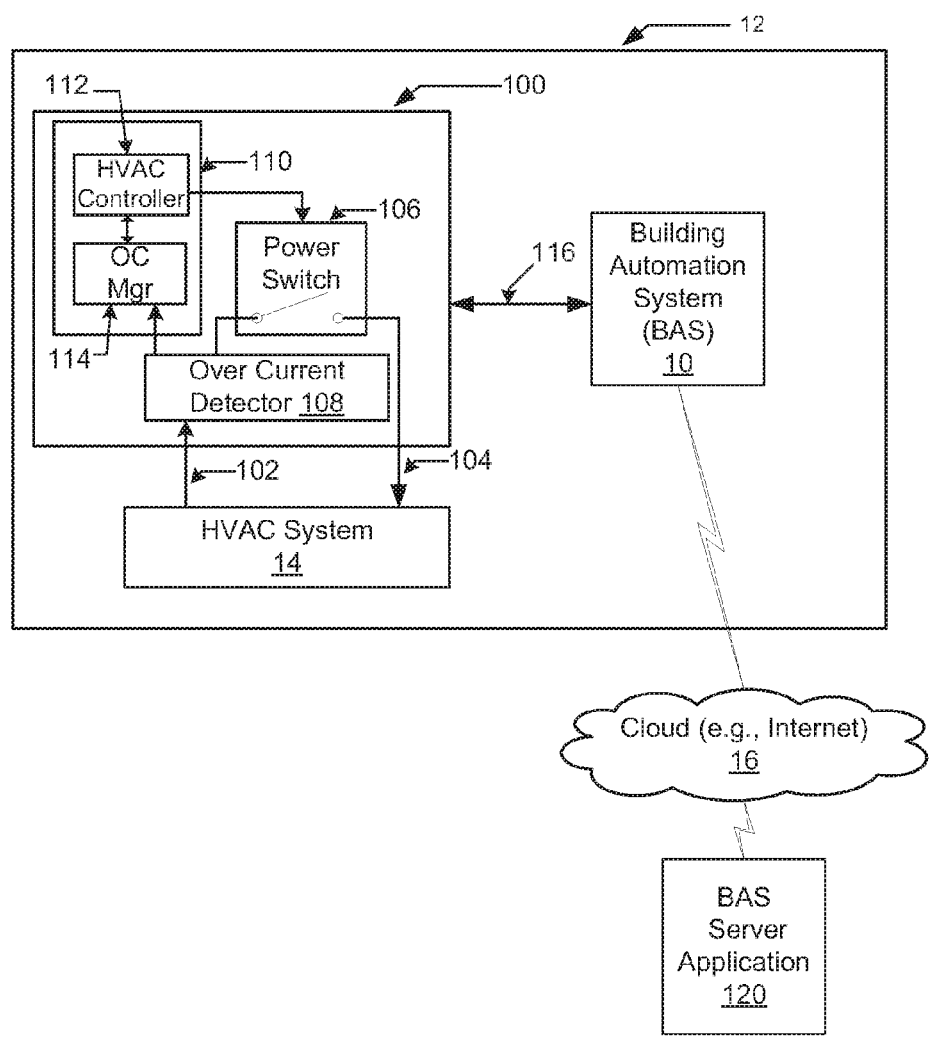
FIG. 1 illustrates a block diagram of an exemplary embodiment of an environmental control device having one or more connections to an HVAC system, where the environmental control device has over current management of the connections.

A block diagram of an exemplary embodiment of an environmental control device or thermostat 100 is shown in FIG. 1 as employed in or with a building automation system (BAS) 10 consistent with the present invention for detecting and controlling temperature conditions within a building 12 in association with an HVAC system 14. As described in further detail herein, the thermostat 100 has at least one power input connection or terminal 102, one or more control output connections 104, and one or more switches 106 for selectively connecting the power input terminal 102 to a respective one or group of the control output connections 104. When connected to a respective power source of the HVAC System (such as a Class 2 transformer), the power input terminal 102 receives a respective power input signal from the HVAC system 14 for turning on or off a corresponding component or mode of operation of the HVAC system 14, such as a fan, heating stage, cooling stage, emergency heat, etc via one of the thermostat's 100 control output connections 104 to the HVAC System 14.

Figure 2:
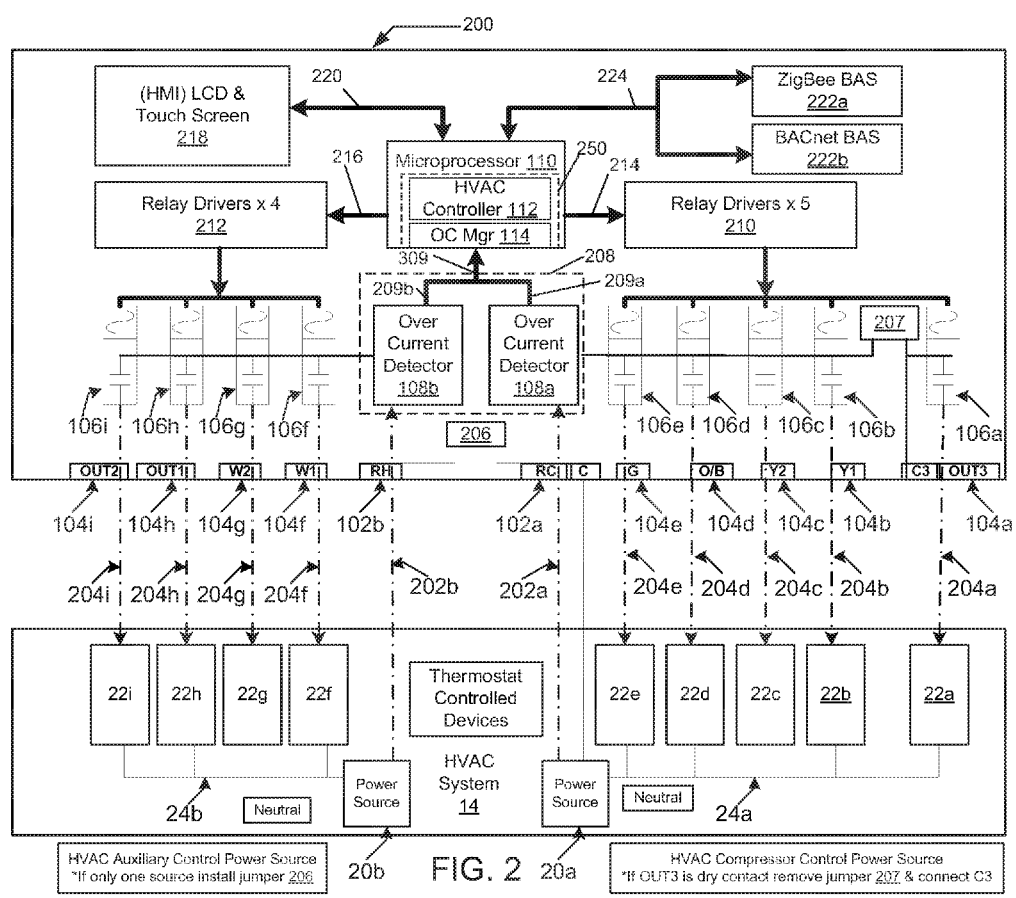
FIG. 2 illustrates an internal block diagram of the exemplary environmental control device shown in FIG. 1.

As part of a first level of over current management of the connections 102 and 104 with the HVAC System 14, the thermostat 100 may further include an over current detector circuit 108 (also referenced as a current threshold detector) that is coupled to the power input terminal 102 to monitor the current of the power input signal present on the power input terminal 102 when the power switch 106 is activated and generate an over current condition signal when the current of the power input signal exceeds a pre-determined current range or window. The thermostat 100 also includes a processor 110 or other controller that executes machine-readable instructions stored in internal or external memory or accessed via the network 116. Examples of a processor 110 may include a microprocessor having one or more cores, microcontroller, application-specific integrated circuit (ASIC), digital signal processor, digital logic devices configured to execute as a state machine, analog circuits configured to execute as a state machine, or a combination of the above. The processor 110 is typically electronically coupled to memory (e.g., 250 as shown in FIG. 2), a network interface and other parts of the thermostat 100 via one or more address and data buses. Internal or external memory employed in the processor 100 may be random access memory, SDRAM, DIMM, or other types of digital storage capable of read/write access.

The processor 110 stores instructions (e.g., in memory 250 as shown in FIG. 2) that comprise an HVAC Controller logic or application 112 (also referenced as "HVAC Controller") and an Over Current Manager logic or application 114 (also referenced as "Over Current Manager"). As described in further detail herein, the HVAC Controller 112 is configured to control activation of the switch 106 based on pre-defined control functions associated with the component or mode of operation assigned to the respective one or more control output connections 104 coupled to the switch 106 and the over current condition as processed by the Over Current Manager 114 and provided to the HVAC Controller 112 to provide over current management of the corresponding connections 102 and 104 from and to the HVAC System 14.

In one implementation, the thermostat 100 includes a network 116 connection (which may include wired or wireless branches) to the BAS 10 for signal communication to a BAS server application 120, which may be employed in the BAS 10 or be hosted on a remote server connected to the BAS 10 via a cloud communication network 16 such as the Internet. In this implementation, upon detecting an over current condition as processed by the Over Current Manager 114 as described herein, the Thermostat 100 may provide a corresponding "service required" message to the BAS server application for transmittal to an applicable service technician or company.

Turning to FIG. 2, an internal block diagram of an environmental control device or thermostat 200 consistent with the thermostat 100 is shown. In this implementation, the thermostat 200 has power input terminals 102a and 102b that are selectively coupled via a jumper 206 or switch (employed in place of jumper 206) that is connected to and activated by microprocessor 110. When a switch is employed in place of the jumper 206 and activated via processor 110 or when a jumper 206 is installed, the power input terminals 102a and 102b are coupled to each other. In this implementation, one of the power input terminals 102a or 102b may be connected, via wiring (corresponding to either signal 202a or 202b represented in dashed lines in FIG. 2), to a single power source 20a or 20b of the HVAC System 14. This enables the thermostat 200 to provide over-current management of the power input signal 202a or 202b from an HVAC System 14 having a single power source 20a or 20b, where the power input signal 202a or 202b is selectively switched by the processor 110 to provide corresponding control signals to components 22a, 22b, 22c, 22d, 22e, 22f, 22g, 22h and 22i of the HVAC System 14.

Alternatively, when the HVAC System 14 has multiple power sources 20a and 20b, the jumper 206 may be removed (or if a switch is employed in lieu of the jumper 206, the switch may be deactivated via microprocessor 110) so that the power input terminals 102a and 102b are not coupled or connected to each other. In this implementation, each power input terminal 102a and 102b may be connected, via wiring (corresponding to either signal 202a or 202b represented in dashed lines in FIG. 2), to a respective power source 20a or 20b of the HVAC System 14. This enables the thermostat 200 to provide over-current management of each power input signal 202a and 202b received from a corresponding power source 20a or 20b of an HVAC System 14, where each power input signal 202a or 202b is selectively switched by the processor 110 to provide corresponding one or more control signals 204a, 204b, 204c, 204d, 204e or 204f, 204g, 204h, 204i to respective components 22a, 22b, 22c, 22d, 22e or 22f, 22g, 22h, 22i of the HVAC System 14. The components 22a, 22b, 22c, 22d, 22e and 22f, 22g, 22h, 22i of the HVAC System 14 may have a neutral or common connection 24a or 24b to the power source 20a or 20b to complete a switched power input signal to control signal circuit path for the respective component 22a, 22b, 22c, 22d, 22e and 22f, 22g, 22h, 22i in accordance with over-current management processes performed by the thermostat 200 as explained in further detail herein.

As shown in FIG. 2, the thermostat 200 may have a first group of control output terminals 104a, 104b, 104c, 104d, and 104e and a first group of switches 106a, 106b, 106c, 106d, and 106e for selectively connecting or coupling the power input terminal 102a to a corresponding one of the first group of the control output terminals 104a, 104b, 104c, 104d, and 104e. The thermostat 200 may also have a second group of control output terminals 104f, 104g, 104h, and 104i and a second group of switches 106f, 106g, 106h, and 106i for selectively connecting the second power input terminal 102b to a respective one of the second group of the control output terminals 104f, 104g, 104h, and 104i. Each of control output terminals 104a, 104b, 104c, 104d, 104e and 104f, 104g, 104h, and 104i connect, via corresponding wiring (corresponding to control output signals 204a, 204b, 204c, 204d, 204e, 204f, 204g, 204h and 204i represented in dashed lines in FIG. 2) to either a single or respective power source 20a or 20b of the HVAC System 14 based on whether the jumper 206 is installed (or corresponding switch is activated by the processor 110) as described herein.

The thermostat 200 also includes a master over current detector circuit 208 that has one or more threshold or over current detectors 108a and 108b consistent with the over current detector 108 depicted in FIG. 1. Each over current detector 108a and 108b is coupled between a respective power input terminal 102a or 102b and an corresponding group of the switches 106a, 106b, 106c, 106d, 106e or 106f, 106g, 106h, 106i. Each over current detector 108a and 108b is operatively configured to: monitor the current of the power input signal 202a or 202b present on the respective power input terminal 102a or 102b when any of the power switches in the corresponding group of power switches 106a, 106b, 106c, 106d, 106e or 106f, 106g, 106h, 106i is activated; and generate a respective over current condition signal 209a or 209b when the current of the power input signal 202a or 202b exceeds a pre-determined current range or window. The master over current detector circuit 208 receives the respective over current condition signals 209a or 209b. In one embodiment, the master over current detector circuit 208 generates a master over current condition signal 309 in response to determining that any one of the over current condition signals 209a or 209b has been received or is present. Alternatively, the master over current detector circuit 208 may include a multiplexor component or similar logic that identifies which of the over current detectors 108a and 108b generated an over current condition to the Over Current Manager 114 for further processing by processor 110 as described in further detail herein. In another embodiment, the processor 110 may have a respective input coupled to each of the over current detectors 108a and 108b to enable the Over Current Manager 114 to receive and directly process each of the over current condition signals 209a 209b. In this embodiment, the master over current detector 208 may be incorporated into or replaced by additional corresponding logic in the Over Current Manager 114 via the processor 110.

The thermostat 200 may also include: a first group of relay drivers 210 that are coupled between the processor 110 and the first group of power switches 106a, 106b, 106c, 106d, 106e; and a second group of relay drivers 212 that are coupled between the processor 110 and the second group of power switches 106f, 106g, 106e, 106f. The processor 110, under the control of program instructions or programming software or firmware contained in the HVAC Controller 112, controls activation of each power switch 106a, 106b, 106c, 106d, 106e, 106f, 106g, 106e, 106f via relay drivers 210 and 212 based on: (1) pre-defined control functions associated with the component or mode of operation assigned to the respective one or more control output terminals 104a, 104b, 104c, 104d, 104e, 104f, 104g, 104h, 104i coupled to the respective switch 106a, 106b, 106c, 106d, 106e, 106f, 106g, 106h, 106i; and (2) the master over current condition signal 309 as processed by the Over Current Manager 114 and provided to the HVAC Controller 112 to provide over current management of the corresponding connections 102a-102b and 104a-104i from and to the HVAC System 14.

The thermostat 200 may further include a user interface 218 coupled to the processor 110 via a standard bus 220 or other bi-directional parallel or serial communication protocol connection. The user interface 218 may be a standard touch screen or combination of a keyboard and display, or other input/output device. When executing instructions or programming software or firmware contained in a setup or configuration application (or part of the Over Current Manager or the HVAC Controller 112) stored in memory 250 of the processor 110, the processor 110 may generate and display a screen via the user interface 218 that includes a user selectable settings input to enable a user (such as a technician or thermostat installer) to identify system parameters to the processor 110 pertaining to the HVAC system components 22a, 22b, 22c, 22d, 22e, 22f, 22g, 22h and 22i that are connected to the processor for controlling such components via respective connections or terminals 104a-104i and managing the over current of such connections 104a-104i to the HVAC System 14. In one embodiment further described in detail herein, the Over Current Manager receives one or more of the system parameters and, based on such received system parameter or parameters, identifies a pre-determined time from among a plurality of times that may be stored by the Over Current Manager for setting a timer 332 to delay determining or confirming whether an over-current condition is still present on any one of the control output connections or terminals 104a-104i coupled to the HVAC system components 22a, 22b, 22c, 22d, 22e, 22f, 22g, 22h and 22i and power input terminal 102a or 102b.

The thermostat 200 may also include a wireless network input/output device 222a that may employ a standard wireless communication protocol, such as ZigBee®, WiFi®, Bluetooth® or other wireless network protocol, for enabling wireless signal communication via network 116 to the BAS 10. In addition, the thermostat 200 may include a wired network input/output device 222b that may employ a standard network communication protocol, such as BACnet™ or other network protocol, for enabling signal communication via network 116 to the BAS 10. Each network input/output device 222a and 222b are coupled to the processor 110 via a standard bus 224 or other bi-directional parallel or serial communication protocol connection.

Figure 3:
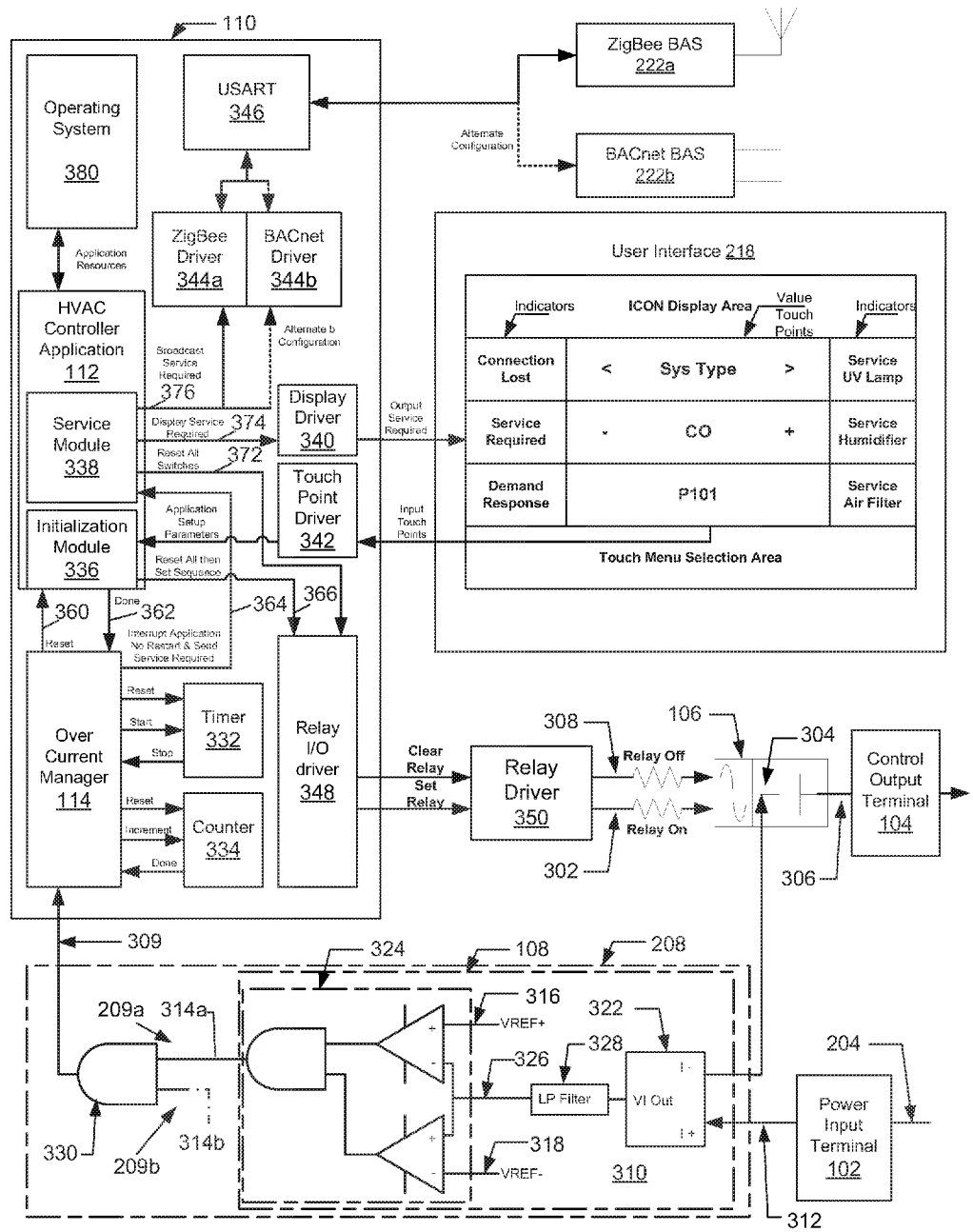
FIG. 3 illustrates an expanded internal block diagram of the environmental control device shown in FIG. 2, including an exemplary embodiment of an over current detector circuit employed in the environmental control device in accordance with the present invention.

Turning to FIG. 3, an expanded internal block diagram of the environmental control device or thermostat 200 is shown. In particular, an exemplary block diagram of an embodiment of the over current detector 108a or 108b and master over current detector 208 that may employed in the thermostat 200. Each over current detector 108a and 108b may have similar structure. To avoid obscuring aspects of the present invention, only one over current detector 108 is described in detail as coupled to the master over current detector 208 and only a portion of the master over current detector 208 is shown in FIG. 3. Switch 106 refers to any of the switches 106a, 106b, 106c, 106d, 106e, 106f, 106g, 106h or 106i. Control Output Terminal 104 refers to any of the terminals 104a, 104b, 104c, 104d, 104e, 104f, 104g, 104h or 104i. Power Input Terminal 102 refers to either terminal 102a or 102b. Over Current Detector 108 refers to either detector 108a or 108b. Power Input Signal 204 refers to either input 204a or 204b.

In the embodiment illustrated in FIG. 3, the environmental control device or thermostat 200 includes a power input terminal 102, a control output terminal 104, a switch 106, and the over current detector 108 coupled to the master over current detector 208. The switch 106 has an activation input 302, a signal input 304 and a signal output 306 connected to the control output terminal 104 and coupled to the signal input 304 when the switch 106 is activated via the activation input 302. In this embodiment, the switch 106 may have a separate reset input 308 to reset or deactivate the switch 106. The power input terminal 102 is operatively connected to the signal input 304 of the switch 106 such that, when in receipt of a power input signal (e.g., 204), the power input signal is presented to the signal input 304 of the switch 106 to drive the control input of a corresponding component of the HVAC system 14 when the switch 106 is activated via the activation input 302. In the embodiment shown in FIG. 3, the signal input 304 of the switch 106 is connected to the power terminal 102 via connections through the over current detector 108.

In one embodiment as shown in FIG. 3, the over current detector 108 is or includes a current comparator 310 having a first input 312 operatively connected to the power input terminal 102 and an output 314a. The current comparator 310 compares the magnitude of the current drawn by all activated switches 106 from power input signal 204 when present on the power input terminals 102 to a first pre-determined current level (e.g., approximately +4 amps or greater positive threshold) and a second pre-determined current level (e.g., approximately −4 amps or greater negative threshold). An over-current condition is generated on the current comparator output 314a when a current of the power input signal 204 exceeds the pre-determined current level in either polarity. The current comparator 310 may be pre-programmed or configured with the pre-determined current level. Alternatively, the current comparator 310 may include one or more inputs 316 and 318 for presenting a reference signal having or defining the pre-defined current level to the current comparator 310. The current comparator 310 may include a window or range comparator 324 in which the current comparator compares the power input signal 204 when present on the power input terminal 102 to both the first pre-determined current level (e.g., approximately +4 amps or greater positive threshold) set by reference voltage 316 and a second pre-determined current level (e.g., approximately −4 amps or greater negative threshold) set by reference voltage 318, and generates an over current condition 209a or 209b on the current comparator output 314a or 314b when a current of the power input signal 204a or 204b exceeds the window or range defined by the first and second pre-determined current levels (e.g., a window or range magnitude greater than 4 amps).

In the embodiment shown in FIG. 3, the current comparator 310 may include a voltage-window-comparator 324, a low pass filter 328 and a current-to-voltage convertor 322, which may be a current sensor, such as a model ACS712 commercially available from Allegro MicroSystems, LLC. The current-to-voltage convertor 322 has or is coupled to the first input 312 of the current comparator 310 that is operatively connected to the power input terminal 102. The current-to-voltage convertor 322 has a voltage output of +2.5 VDC corresponding to one half of the voltage supply such as +5 VDC when current from 312 to 304 is 0A. Converter 322 output goes positive from +2.5 VDC to +5 VDC as current increases from 0A to 25A into the I+ pin and output goes negative from +2.5 VDC to 0VDC as current increases from 0A to 25A into the I− pin. The current-to-voltage convertor 322 output is coupled through the low pass filter 328 to a signal input 326 of the voltage window comparator 324. In this embodiment, voltage-window-comparator 324 consists of two standard comparators and a logical AND gate using signal 326 as the first input. The second input 316 is a first voltage reference signal (e.g., VREF+) that corresponds to or defines the first pre-defined current level of the current window comparator 310. For example, the second input 316 is a first voltage reference signal (e.g., VREF+) set to approximately +3.31V or greater voltage threshold that corresponds to approximately +4 amps or greater positive current when the power input signal 204 is converted by the current-to-voltage converter 322. Continuing with this embodiment, the third input 318 is a second voltage reference signal (e.g., VREF−) that corresponds to or defines the second pre-defined current level of the current window comparator 310. For example, the third input 318 is a second voltage reference signal (e.g., VREF−) set to approximately +1.69V or less voltage threshold that corresponds to approximately −4 amps or greater negative current when the power input signal 204 is converted by the current-to-voltage converter 322. The over current detector 108 or current comparator 310 may also include a low pass filter 328 coupled between the output of the current-to-voltage convertor 322 and the signal input 326 of the voltage-window-comparator 324 that filters or removes high frequency noise from the power input signal 312 after converting to a corresponding voltage signal by the current-to-voltage converter 322 and before being processed by the voltage-window-comparator 324.

The master over current detector circuit 208 receives the respective over current condition signals 209a or 209b from the output of each over current detector 208 (which is the output 314a of the current comparator 310 in the embodiment of the current detector 208 depicted in FIG. 3). The master over current detector circuit 208 may include a NAND gate 330 or corresponding processing circuitry and logic to generate a master over current condition signal 309 in response to determining that any one of the over current condition signals 209a or 209b has been received or is present. The processor 110 receives the master over current condition signal 309 (or alternatively each current condition signal 209a and 209b) to enable the Over Current Manager 114 to receive and process the master over current condition signal 309 and/or each of the over current condition signals 209a and 209b.

As shown in FIG. 3, the processor 110 stores (e.g., in memory 250 as shown in FIG. 2) the HVAC Controller 112 and the Over Current Manager 114. The processor 110 may also have or store in memory a timer 332 and a counter 334. As described in further detail herein, the processor 110 when under the control of the Over Current Manager 114 initializes the timer 332 to a pre-determined time that corresponds to a length time to permit an inrush current of a power input signal to pass through any of the switches 106a-106i when activated and a corresponding HVAC system component 22a-22i is powered on. To determine the pre-determined time, the inventors' conducted an assessment and experimentation using the thermostat 200 to selectively switch power on and off to HVAC system components 22a-22i when wired to corresponding connections or terminals 104a-104i in compliance with National Electrical Manufacturers Association (NEMA) DC 3 standard for "Residential Controls for Electrical Wall-Mounted Room Thermostats." Based on such experimentation, the inventors discovered that the timer 332 may be set at a predetermined time in the range of 30 ms to 50 ms so that the Over Current Manager 114 delays taking any action due to detection of an over current condition 209a or 209b and avoids unnecessary deactivation of the power switches 106a-106i (or tripping of any power distribution circuit breakers) while still inhibiting any harmful damage to the thermostat 200 and surrounding spaces. Timer delay is derived both from maximum pull-in time of a representative contactor of switch 106 at minimum operating voltage and minimum $i^2t$ heating time of the power supply (where "i" represents current present on the contactor switch for a time "t"), power wiring, power terminals, switch contacts and printed circuit board traces. Typically HVAC transformers are sized for rated current at rated voltage and can be expected to supply inrush current in excess of rating for short duration under the conditions that voltage output will drop causing contactor pull-in time to increase. Standard contactors used have pull-in times up to 20 ms at minimum voltage while all components in current circuit can handle inrush current for up to 100 ms. Moreover, as explained in further detail herein, the processor 110 when under the control of the Over Current Manager 114, controls the retry counter 334 to enable the Over Current Manager 114 in cooperation with the HVAC controller 112 to manage the number of attempts to reset and re-initialize each of the switches 104-104i to power on corresponding HVAC system components 22a-22i in an effort to clear or remove an over current detection 209a or 209b before generating a service required message.

The HVAC controller 112 may include an initialization module 336 or specific set of instructions or logic for initializing the HVAC controller 112 and assigned functions for controlling the HVAC System components 22a-22i (such as a fan, heating stage, cooling stage, emergency heat, etc) via the corresponding power switches 106a-106i and control output connections 104 to the HVAC system components 22a-22i. The HVAC controller initialization module 336 receives a reset command 360 from the Over Current Manager 114 and in response signal 366 deactivates or resets each of the switches 106a-106i and then sets them in accordance with the assigned functions of the HVAC System component 22a-22i connected to the switch 106a-106i via a respective output control connection or terminal 104a-104i. On completion of initialization module 336 sends done signal 362 to Over Current Manager 114.

The HVAC controller 112 may also include a Service Module 338 that receives communications from the Over Current Manager 114 for prompting display of a "service required" message to the User Interface 218 (via drivers 340 and 342) or for prompting communication of a "service required" message to the BAS 10 (via drivers 344a and 344b). In particular, in the event the Over Current Manager 114 actions do not clear the over current fault within the specified number of retries the Service Module 338 is sent an interrupt signal 364. In response Service Module 338 retains control until power is recycled, sends a reset signal 372 to all relays, sends a message 374 to the display driver 340 and sends a message 376 to the selected BAS communication driver 344a or 344b. Thus, the combination of the HVAC controller 112, Initialization Module 336, Service Module 338, and the Over Current Manager 114 enables the thermostat 200 to effectively manage disabling or interrupting the switched control signals 204a-204i sent to the HVAC System components 22a-22i as part of the over current management of the corresponding output control connections or terminals 104a-104i that carry the switched control signals 204a-204i to the HVAC System components.

The processor 110 may also have or store (e.g., in memory 250 as shown in FIG. 2) a standard Operating System, such as Texas Instruments Stellaris® implementation of Harvard Architecture running on the Cortex-M4 processor and peripherals for supporting and allocating memory resources to the HVAC Controller application 112 during operation. The processor 110 may further include or store (e.g., in memory 250 as shown in FIG. 2) a display driver 340 for generating and displaying a graphic, message, system parameter or other output on the user interface 218; a touch point driver 342 for receiving user specified selections or inputs via the user interface 218; a first I/O driver 344a for communicating messages to the wireless network input/output device 222a for wireless transmission to the BAS 10; and a second I/O driver 344b for communicating messages to the network input/output device 222b for wired network transmission to the BAS 10. The thermostat 200 or processor 110 may also include an Universal Synchronous/Asynchronous Receiver/Transmitter (USART) 346 that is coupled between the I/O drivers 334a and 334b and the network input/output devices 222a and 222b, respectively, to facilitate serial communication to the BAS 10 over the network 116 using a standard communication protocol.

In addition, the thermostat 200 or processor 110 may also include or store (e.g., in memory 250 as shown in FIG. 2) a relay I/O driver 348 that is in signal communication with the relay drivers 210 and 212 for enabling the HVAC Controller 112 to control activating or setting and deactivating or clearing each switch 106 in conjunction with the over current management processes performed by the thermostat as described in further detail herein.

Turning to FIG. 4A, a flow diagram of a process 400 and associated sub-processes for over current management of connections between the environmental control device or thermostat and components of an HVAC system. The process may be performed by the thermostat 100 or 200. For example, the process may be performed by the processor 110 under the control of the Over Current Manager 114 and the HVAC Controller 112.

At power on, the thermostat 100, 200 may initialize the HVAC controller under control of sub-process 430 in FIG. 4B. In step 432, power on resets processor 110 and its operating system 380. In Step 434, the processor 110 may load an initial HVAC system setup from parameters previously stored in non-volatile memory by the installer into active memory RAM (each of which may correspond to or be incorporated in memory 250 in FIG. 2), including configuration for switches 106a-106i, parameters and functions assigned to each output control connection 104a-104i in step 432. For example, the HVAC controller 112 may generate a display on the user interface 112 that includes a menu of parameters that the installer may select or set to identify corresponding functions to assign to an output control connection 104a-104i of the thermostat for controlling a respective component 22a-22i of the HVAC System 112 via switches 106a-106i. In step 436, the processor 110 may store in active memory the selected parameters in association with the corresponding functions previously saved in non-volatile memory by the installer or user for controlling the corresponding HVAC System components 22a-22i (such as a fan, heating stage, cooling stage, emergency heat, etc).

In one embodiment, the thermostat 100, 200, via the processor 110 under the control of sub-process 440 in FIG. 4C, initializes the HVAC controller 112. In step 442, Over Current Manager 114 asserts the reset signals to the HVAC Controller Initialization Module 336, Timer 332 and Counter 334 while inactivating Application interrupt signal 364 to the HVAC controller 112. In step 444, the Initialization Module 336 response to reset signal 360 then deactivates each of the switches 106a-106i (via removing the activation input 302 or setting the reset input 308 of the switch), and restarts the corresponding functions of the HVAC Controller 112 assigned to the respective output control connections 104a-104i based on the selected parameters, which includes reactivating each of the switches 106a-106i in accordance with the corresponding functions assigned to the respective output control connection 104a-104i for controlling the corresponding HVAC System components 22a-22i (such as a fan, heating stage, cooling stage, emergency heat, etc). In step 446, the Initialization Module 336 asserts the done signal 362 to the Over Current Manager 114. The process depicted in FIG. 4C for initialing the HVAC controller then ends.

After initialing the HVAC controller, the thermostat 100, 200 via the Over Current Manager 114 determines whether an over current condition event has occurred in step 402. The thermostat 100, 200, via the processor 110 under the control of the Over Current Manager 114, may determine an over current condition event has occurred when the processor 110 receives a master over current condition signal 309 generated by the master over current detector circuit 208 or any one of the over current condition signals 209a or 209b generated by a respective over current detector 108a or 108b.

If it is determined that an over current condition event has not occurred, Over Current Manager 114 may continue background processing at step 402.

Step 402 simultaneously allows the HVAC Controller Application 112 to perform other processes via processor 110 executing parallel threads while awaiting for an over current condition event that results in an over current reset event indicated by "reset" signal 360.

If an over current condition event has occurred, the Over Current Manager 114 in step 404 initializes or resets the retry counter 334 to reflect a new over current management cycle and in step 406 initializes and activates the over current timer 332 to a pre-determined time. The processor 110 under the control of the Over Current Manager 114 may perform step 406 by sending first reset then start signals to the over current timer 332. The pre-determined time corresponds to a length time to permit an inrush current of a power input signal to pass through any of the switches 106a-106i when activated and a corresponding HVAC system component 22a-22i is powered on. The pre-determined time may be set in the range of 30 ms to 50 ms. In one embodiment, the predetermined time is set to 30 ms+/−5 ms or lower tolerance.

Next, the Over Current Manager 114 via the processor 110 determines whether the timer 332 reflects that the pre-determined time (e.g., 30 ms) has expired in step 408. If it is determined that the timer 332 reflects that the pre-determined time has not expired, the Over Current Manager 114 determines whether an over current condition event is still present in step 410. The Over Current Manager 114 via the processor 110 may determine the over current condition event is still present by determining if the master over current condition signal 309 is still being generated by the master over current detector circuit 208 or if any one of the over current condition signals 209a or 209b is still being generated by a respective over current detector 108 (e.g., the over current condition signal 209a or 209b is still present on the output 314a or 314b of the respective current comparator 324).

If it is determined that the over current condition event is still present, the processor 110 under the control of the Over Current Manager 114 continues processing at step 408 to reexamine whether the over current timer 332 has expired. If it is determined that the over current condition event is no longer present, then the Over Current Manager 114 via the processor 110 executes sub-process 440 in FIG. 4C to initialize a new over current management cycle and continues processing at step 402 to monitor a new over current condition event.

If it is determined in step 408 that the timer 332 reflects that the pre-determined time (e.g., 30 ms) has expired while the over current condition event is still present the Over Current Reset Event is activated and the Over Current Manager 114 via the processor 110 increments the retry counter 334 (step 412) and restarts the HVAC Controller initialization of functions assigned to the respective output control connections (step 414). In the embodiment shown in FIG. 3, the Over Current Manager 114 performs step 414 by sending the reset signal 360 to the HVAC Controller Initialization Module 336 to prompt the HVAC Controller 112 to deactivate each of the switches 106a-106i (via removing the activation input 302 or setting the reset input 308 of the switch), and restart the corresponding functions of the HVAC Controller 112 assigned to the respective output control connections 104a-104i, which includes reactivating each of the switches 106a-106i in accordance with the corresponding functions assigned to the respective output control connection 104a-104i. Thus, after waiting a predetermined time to ensure the passing or settlement of any spurious and likely non-damaging over currents on output control connections 104a-104i (e.g., such as over current in-rush due to switch contactor pull-in and the switch reaching a steady state closure) before determining whether the over current condition event is still present, the Over Current Manager 114 enables the thermostat 100, 200 to reset all switches 104a-104i including any which may be exhibiting a temporary problem (e.g., stuck switch) and avoid unnecessary stoppage of the control of the HVAC System components 22a-22i that otherwise would have required manual inspection or servicing.

Continuing with FIG. 4A, Over Current Manager 114 via processor 110 determines whether the restart sequence performed by the HVAC Controller Initialization Module 336 in response to the reset signal 360 is done or completed. The Over Current Manager 114 may determine that the restart sequence is done in response to receiving the "done" acknowledgment signal 362 from the HVAC Controller Initialization Module 336. If it is determined that the restart sequence is not done, then the Over Current Manager 114 via the processor 110 may continue processing at step 416. Thus, before continuing with the over current management of the current over current reset event, the Over Current Manager 114 is able to ensure that the switches 106a-106i have been set in accordance with restarting the corresponding functions of the HVAC Controller 112 assigned to the respective output control connections 104a-104i.

If it is determined that the restart sequence is done, then the Over Current Manager 114 via the processor 110 determines whether the retry counter 334 exceeds a predetermined number of retries in step 418. If it is determined that the retry counter 334 has not exceeded the predetermined number of retries, then the Over Current Manager continues processing at step 406 to continue the current over current management cycle of the control output connections 104a-104i to the HVAC System 14. The predetermined number of retries are greater than one but preferably no more than three in order for the Over Current Manager 114 to determine while performing process 400 that an over current condition exits in association with one or more of the power switches 106a-106i that cannot be inhibited or resolved by the Over Current Manager 114 and may require servicing.

If it is determined that the retry counter 334 has exceeded the predetermined number of retries, then the Over Current Manager via the processor 110 prompts the HVAC Controller 112 to halt the HVAC Controller functions assigned to output control connections and provide a corresponding service request in step 420 before ending processing of the current over current management cycle. The processor 110 under the control of the Over Current Manager 114 may perform step 420 by sending an interrupt signal 364 to the HVAC Controller 112 Service Module 338 as shown in FIG. 3.

In response to the application interrupt signal 364, the HVAC Controller 112 via the processor may perform the sub-process 450 depicted in FIG. 4D. In step 452, the processor 110 under the control of the HVAC Controller 112 Service Module 338 activates reset signal 372. In the implementation shown in FIG. 3, the Relay I/O driver 348 then deactivates all the switches 106a-106i (via removing the activation input 302 or setting the reset input 308 of the respective switch) causing all switches 106a-106i to be in the "off" state removing input power 204 from contacts 306 on all terminals 104a-104i which in turn de-energizes all controlled devices 22a-22i in HVAC System 14.

Next, in step 454, the processor 110 prompts the User Interface 218 to display a "Service Required" indicator. In the implementation shown in FIG. 3, the HVAC Controller 112 via the processor 110 sends a service required signal or message 374 to the display driver 340 which subsequently sends an "output service required" signal or message to the User Interface 218 to cause the User Interface 218 to display a "Service Required" indicator for a user or technician.

The HVAC Controller 112 may also broadcast a "Service Required" message the BAS 10 in step 456 for subsequent direct transmittal to an applicable service technician or company or indirect transmittal via the BAS server application 120 hosted on a remote server connected to the BAS 10 via a cloud communication network 16. In the embodiment depicted in FIG. 3, the HVAC Controller 112 via the processor 110 may send a "Broadcast Service Required" message 376 via either the first I/O driver 344a for communicating messages to the wireless network input/output device 222a for wireless transmission to the BAS 10, or the second I/O driver 344b for communicating messages to the network input/output device 222b for wired network transmission to the BAS 10.

The HVAC Controller 112 may perform step 458 before, concurrently or subsequent to steps 454 and 456 to hold the further activation of switches 106a-106i or performance of functions assigned to the output control connections 104a-104i until an installer performs the requested service and cycles power to the thermostat 100, 200 thus restarting process 400 in FIG. 4A.

It will be understood and appreciated that one or more of the processes, sub-processes, and process steps described in connection with FIG. 4A-4D may be performed by hardware alone or a combination of hardware and software employed in the thermostat 100 or 200. The software may reside in a memory internal or external to the processor 110 as depicted in the thermostat 100 or 200 of FIGS. 1, 2 and 3. The software residing in memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within the processor 110, which may include, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example thermostats or environmental control devices described in this application may be implemented in a variety of configurations and operate as hardware/software components in a single unit, or in separate combination of hardware/software units.

The executable instructions that comprise the HVAC Controller 112, the Over Current Manager 114 and other applications described herein may be implemented as a single computer program product having instructions stored there in which, when executed by the processor 110 or other processing module of the thermostat 100, 200 direct the thermostat to carry out the instructions. The computer program product may be selectively embodied in any non-transitory computer readable storage medium for use by or in connection with the processor 110 or other processing module of the thermostat 100, 200 that may selectively fetch the instructions from the computer readable storage medium and execute the instructions. In the context of this document, computer-readable storage medium is any non-transitory means that may store the computer program product for use by or in connection with the processor 110 or other processing module of the thermostat 100, 200. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An environmental control device for managing over current of a control input of an HVAC system, comprising:
   a control output terminal;
   a switch having an activation input, a signal input and a signal output connected to the control output terminal and coupled to the signal input when the switch is activated via the activation input;
   a power input terminal operatively connected to the signal input of the switch such that, when in receipt of a power input signal, the power input signal is presented to the signal input of the switch to drive the control input of the HVAC system when the switch is activated via the activation input;

an over current detector having a first input operatively connected to the power input terminal and an over current detector output, the over current detector comparing the power input signal when present on the power input terminal to a pre-determined current level and generating an over-current condition on the over current detector output when a current of the power input signal exceeds the pre-determined current level;

a timer;

a processor operatively coupled to the activation input, the over current detector output and the timer;

wherein the processor, (a) activates the switch via the activation input;

(b) determines whether the over current condition is present on the over current detector output;

in response to determining the over current condition is present, (c) initializes the timer to a pre-determined time;

(d) activates the timer;

(e) determines whether the over current condition is still present on the over current detector output when the timer reflects that the pre-determined time has expired;

in response to determining the over current condition is still present when the timer reflects that the pre-determined time has expired, (f) deactivates the switch via the activation input; and a counter, wherein the processor is operably coupled to the counter and further configured to:

in response to determining the over-current condition is still present when the timer reflects that the pre-determined time has expired, (g) increment the counter;

(h) determine whether the counter exceeds a predetermined number of retries;

in response to determining the counter has not exceeded the predetermined number of retries;

(i) reactivate the switch via the activation input.

2. The environmental control device of claim 1, wherein in step (c) the timer is set to a predetermined time equal to or greater than a cycle time for the switch to reach a steady state closure when activated.

3. The environmental control device of claim 1, further comprising a user interface, wherein, in response to determining the counter has exceeded the predetermined number of retries, the processor prompts the user interface to display a service required indicator.

4. The environmental control device of claim 1, further comprising a network input/output device, wherein, in response to determining the counter has exceeded the predetermined number of retries, the processor transmits a service required message via the network input/output device.

5. The environmental control device of claim 1, wherein the over current detector comprises a current comparator having the first input and the over current detector output and the current comparator compares the power input signal when present on the power input terminal to a first predetermined current level in the range of approximately +4 amps or greater.

6. The environmental control device of claim 1, wherein the over current detector comprises a current window comparator that includes the first input, the over current detector output, a second input for presenting a first reference signal having the first pre-determined current level to the current comparator, and a third input for presenting a second reference signal having a second pre-determined current level to the current comparator.

7. The environmental control device of claim 6, wherein the first pre-determined current level is in the range of approximately +4 amps or greater positive threshold.

8. The environmental control device of claim 6, wherein the second pre-determined current level is in the range of approximately −4 amps or greater negative threshold.

9. The environmental control device of claim 3, wherein the over current detector comprises a current comparator that includes a voltage comparator and a current-to-voltage convertor, the voltage comparator has a signal input, a second input that connects to a first voltage reference signal that corresponds to the first pre-determined current level and a third input that connects to a second voltage reference signal that corresponds to a second pre-determined current level, the current-to-voltage convertor is coupled to the first input of the over current detector that is operatively connected to the power input terminal and has a voltage output that is coupled to the signal input of the voltage comparator.

10. The environmental control device of claim 9, wherein the first voltage reference signal is within a voltage range that corresponds to approximately +4 amps or greater positive current when the power input signal is converted by the current-to-voltage converter.

11. The environmental control device of claim 9, wherein the second voltage reference signal is within a voltage range that corresponds to approximately −4 amps or greater negative current when the power input signal is converted by the current-to-voltage converter.

12. The environmental control device of claim 1, wherein the over current detector is one of a plurality of over current detectors and further comprising a master over current detector circuit that includes the plurality of over current detectors and generates a master over current condition signal output in response to receiving any one of the over current condition signals generated by the respective over current detectors.

13. A method for managing over current of a control input of an HVAC system with an environmental control device including:

a control output terminal;

a switch having an activation input, a signal input and a signal output connected to the control output terminal and coupled to the signal input when the switch is activated via the activation input;

a power input terminal operatively connected to the signal input of the switch such that, when in receipt of a power input signal, the power input signal is presented to the signal input of the switch to drive the control input of the HVAC system when the switch is activated via the activation input;

an over current detector having a first input operatively connected to the power input terminal and an over current detector output, the over current detector comparing the power input signal when present on the power input terminal to a pre-determined current level and generating an over-current condition on the over current detector output when a current of the power input signal exceeds the pre-determined current level;

a timer;

at least one processor operatively coupled to the activation input, the over current detector output and the timer;

the method comprising through operation of the at least one processor:

(a) activating the switch via the activation input;
(b) determining whether the over current condition is present on the over current detector output;
in response to determining the over current condition is present,
(c) initializing the timer to a pre-determined time;
(d) activating the timer;
(e) determining whether the over current condition is still present on the over current detector output when the timer reflects that the pre-determined time has expired;
in response to determining the over current condition is still present when the timer reflects that the pre-determined time has expired,
(f) deactivates the switch via the activation input; and
a counter, wherein the at least one processor is operably coupled to the counter, further comprising through operation of the at least one processor:
in response to determining the over-current condition is still present when the timer reflects that the pre-determined time has expired,
(g) incrementing the counter;
(h) determining whether the counter exceeds a predetermined number of retries;
in response to determining the counter has not exceeded the predetermined number of retries;
(i) reactivating the switch via the activation input.

14. The method of claim 13, wherein in (c) the timer is set to a predetermined time equal to or greater than a cycle time for the switch to reach a steady state closure when activated.

15. The method of claim 13, wherein the environmental control device further includes a user interface, further comprising through operation of the at least one processor:
in response to determining the counter has exceeded the predetermined number of retries, prompting the user interface to display a service required indicator.

16. The method of claim 13, wherein the environmental control device further includes a network input/output device, further comprising through operation of the at least one processor:
in response to determining the counter has exceeded the predetermined number of retries, transmitting a service required message via the network input/output device.

17. A non-transitory computer readable medium encoded with executable instructions that when executed, cause at least one processor to carry out the method for managing over current of a control input of an HVAC system with an environmental control device including:
a control output terminal;
a switch having an activation input, a signal input and a signal output connected to the control output terminal and coupled to the signal input when the switch is activated via the activation input;
a power input terminal operatively connected to the signal input of the switch such that, when in receipt of a power input signal, the power input signal is presented to the signal input of the switch to drive the control input of the HVAC system when the switch is activated via the activation input;
an over current detector having a first input operatively connected to the power input terminal and an over current detector output, the over current detector comparing the power input signal when present on the power input terminal to a pre-determined current level and generating an over-current condition on the over current detector output when a current of the power input signal exceeds the pre-determined current level;
a timer;
the at least one processor operatively coupled to the activation input, the over current detector output and the timer;
the method comprising:
(a) activating the switch via the activation input;
(b) determining whether the over current condition is present on the over current detector output;
in response to determining the over current condition is present,
(c) initializing the timer to a pre-determined time;
(d) activating the timer;
(e) determining whether the over current condition is still present on the over current detector output when the timer reflects that the pre-determined time has expired;
in response to determining the over current condition is still present when the timer reflects that the pre-determined time has expired,
(f) deactivates the switch via the activation input; and
a counter, wherein the at least one processor is operably coupled to the counter, further comprising through operation of the at least one processor:
in response to determining the over-current condition is still present when the timer reflects that the pre-determined time has expired,
(g) incrementing the counter;
(h) determining whether the counter exceeds a predetermined number of retries;
in response to determining the counter has not exceeded the predetermined number of retries;
(i) reactivating the switch via the activation input.

* * * * *